United States Patent [19]

Wu

[11] Patent Number: 5,285,302

[45] Date of Patent: Feb. 8, 1994

[54] TFT MATRIX LIQUID CRYSTAL DISPLAY WITH COMPENSATION CAPACITANCE PLUS TFT STRAY CAPACITANCE CONSTANT IRRESPECTIVE OF MASK MISALIGNMENT DURING PATTERNING

[75] Inventor: Biing-Seng Wu, Hsinchu, Taiwan

[73] Assignee: Industrial Technology Research Institute, Hsinchu, Taiwan

[21] Appl. No.: 860,430

[22] Filed: Mar. 30, 1992

[51] Int. Cl.$^5$ .............................. G02F 1/1343
[52] U.S. Cl. .......................... 359/59; 359/55; 359/57
[58] Field of Search ............... 359/59, 57, 55

[56] References Cited

U.S. PATENT DOCUMENTS

| | | | |
|---|---|---|---|
| 4,762,398 | 8/1988 | Yasui et al. | 359/59 |
| 4,840,460 | 6/1989 | Bernot et al. | 359/59 |
| 4,869,576 | 9/1989 | Aoki et al. | 359/59 |
| 4,955,697 | 9/1990 | Tsukada et al. | 359/57 |
| 5,151,805 | 9/1992 | Takeda et al. | 359/57 |
| 5,182,661 | 1/1993 | Ikeda et al. | 359/59 |
| 5,191,451 | 3/1993 | Katayama et al. | 359/59 |

FOREIGN PATENT DOCUMENTS 0010225 1/1991 Japan ........................ 359/58

OTHER PUBLICATIONS

Kaneko et al, "Analysis and Design of a-Si TFT/LCD Panels with a Pixel Model", *IEEE Transaction on Electron Devices*, vol. 36, No. 12, Dec. 1989, pp. 2953-2958.
Kanemori et al, "10.4-in.-diagonal color TFT-LCDs without residual images", 1990 *SID Digest*, pp. 408-411.
Resor, "Lithography for flat panel video displays," *Solid State Technology*, Feb. 1988, pp. 103-107.
Nakazawa et al, "The 8.6 inch-diagonal TFT-LCDs of symmetric sub-dot design", *1991 IEEE*, pp. 119-121.

Primary Examiner—William L. Sikes
Assistant Examiner—Anita Pellman Gross
Attorney, Agent, or Firm—H. C. Lin

[57] ABSTRACT

A thin film switching array includes a plurality of switching elements arranged in the shape of an array on a substrate. Each switching element includes a thin film transistor and a compensation capacitor. One electrode of the compensation capacitor is formed by the same mask layer as the gate of the thin film transistor, and the other electrode of the compensation capacitor is common to the source electrode of the thin film transistor. The butting error due to multiple exposures of the number of blocks to compose a large area active matrix liquid crystal display, known as the block division effect, can be eliminated by laying out the compensation capacitor with area complementary to that of the stray capacitance such that the summation of the two capacitances remain constant. With constant capacitance, the feedthrough transient from the gate sigate to the liquid crystal display element becomes uniform, and one common compensating voltage can be used to offset the transient effect.

10 Claims, 15 Drawing Sheets

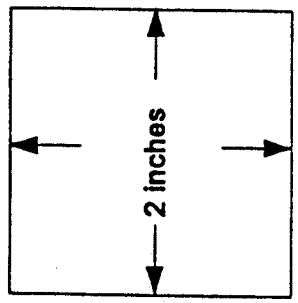
one exposure area
Fig. 6(b)
alignment key
Fig. 6(c)
pads & interconnection
Fig. 6(d)
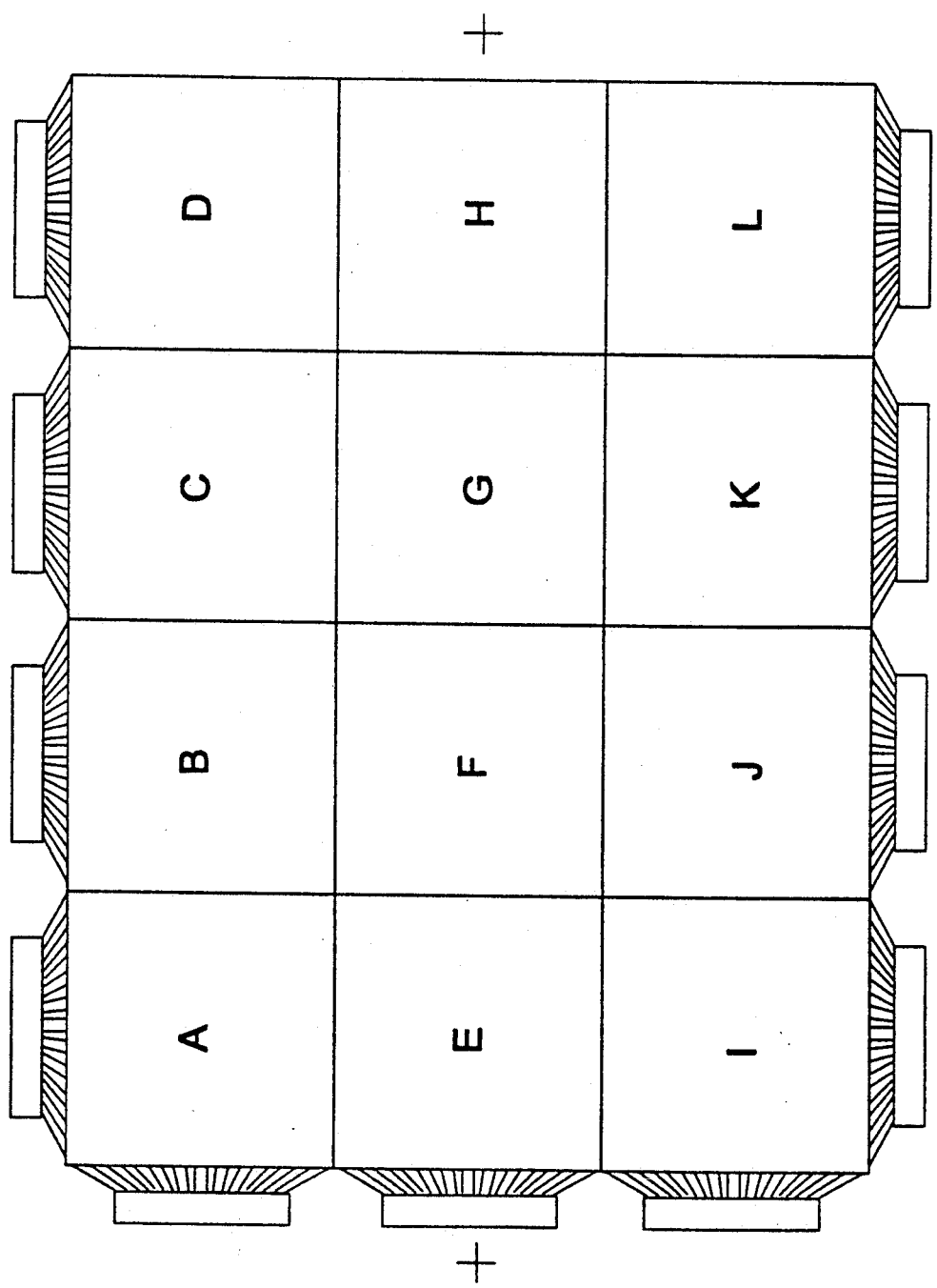
Fig. 6(a)

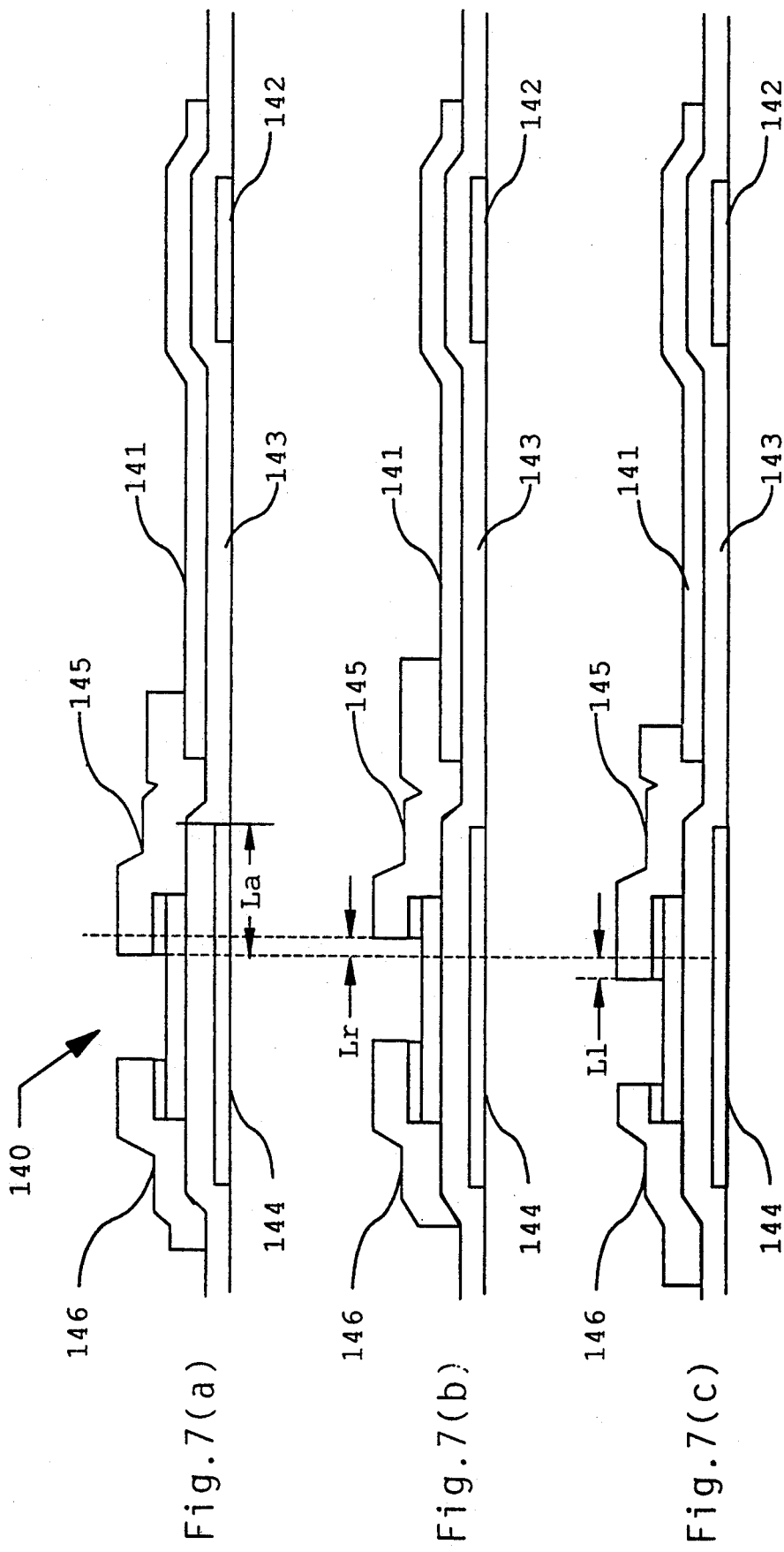

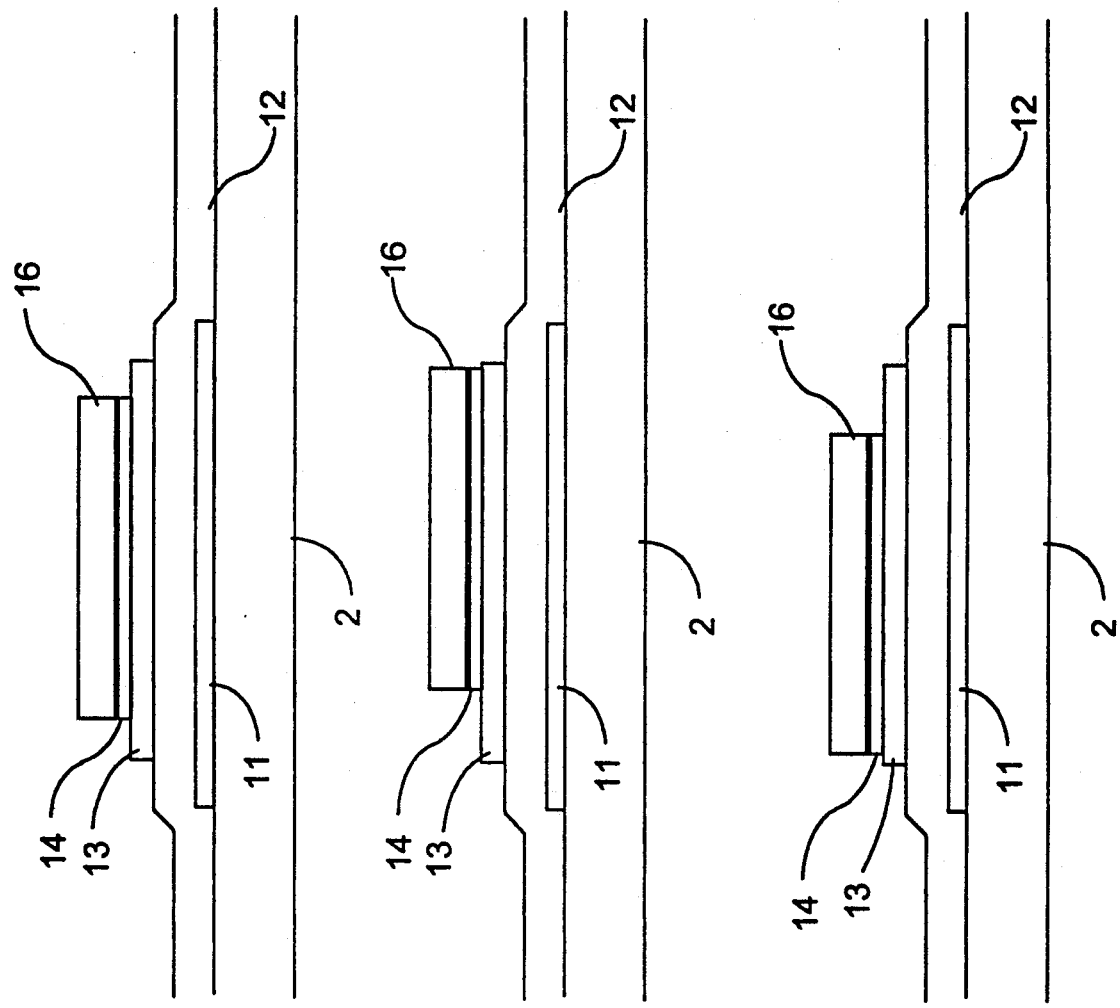

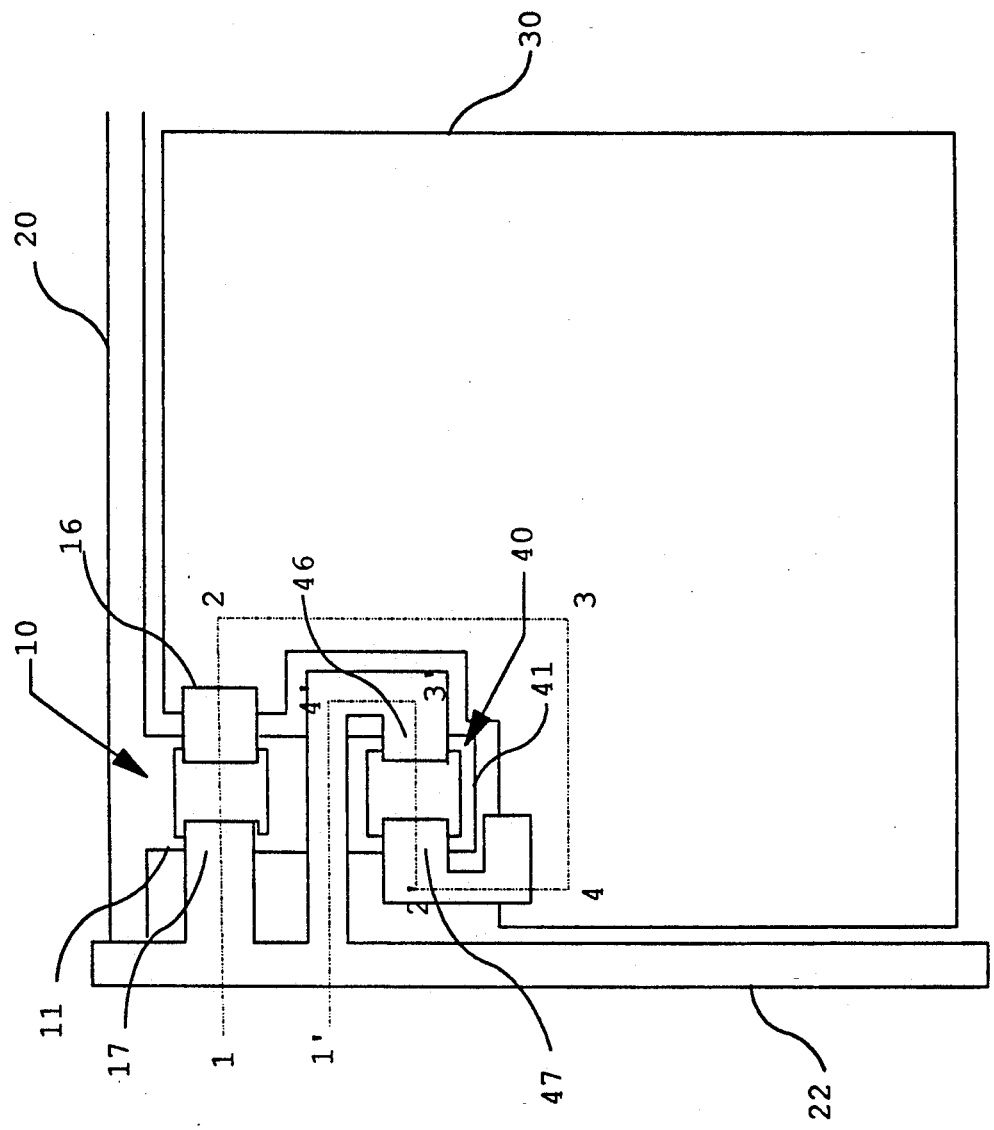

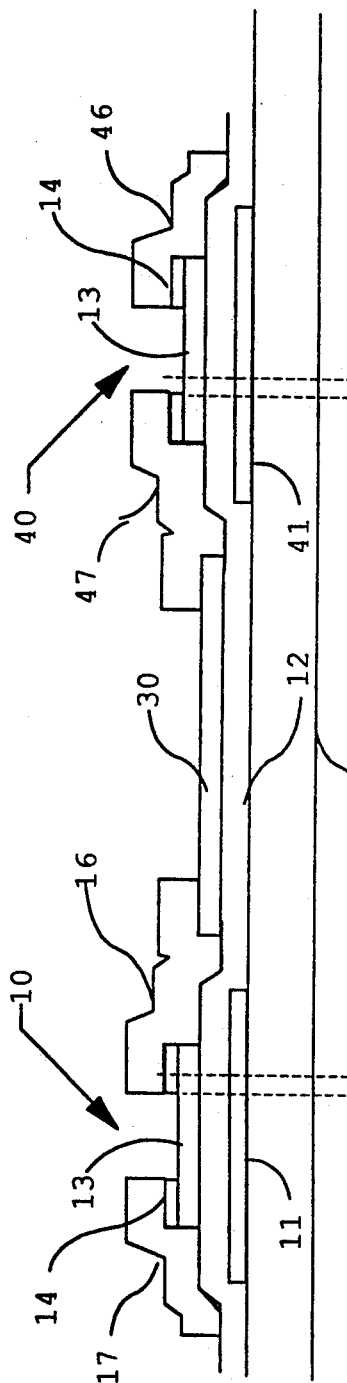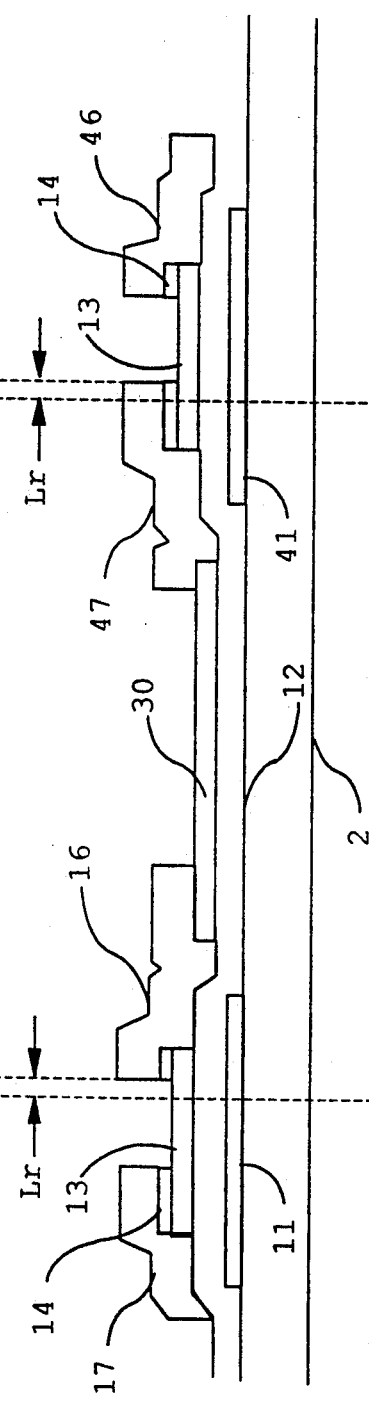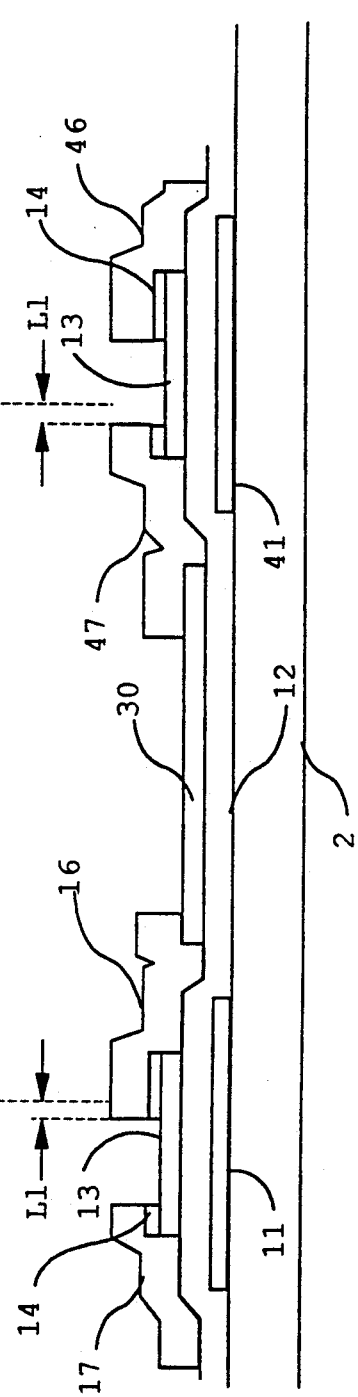
Fig.16(a)
Fig.16(b)
Fig.16(c)

TFT MATRIX LIQUID CRYSTAL DISPLAY WITH COMPENSATION CAPACITANCE PLUS TFT STRAY CAPACITANCE CONSTANT IRRESPECTIVE OF MASK MISALIGNMENT DURING PATTERNING

BACKGROUND OF THE INVENTION

The present invention relates generally to an active matrix liquid crystal display device, in which liquid crystal cells are arranged in a matrix as picture elements (pixels) and are driven through active devices to provide the display.

In particular, this kind of matrix display system is suitable for large area display devices utilizing a large area exposure machine (stepper) during the photolithography process for manufacturing the active matrix device.

Recently, high definition display has been in demand. Amorphous silicon thin film field effect transistors (TFT) are recognized as a good candidate to reproduce high quality, fine line images.

When TFTs are used, every pixel is composed of a TFT and a liquid crystal display element. The pixels are arranged in a matrix form. The liquid crystal medium is sandwiched between two transparent glass substrates. The individual electrodes of the liquid crystal display elements are disposed on the first substrate, and the common display electrodes are disposed on the second transparent glass substrate. FIG. 1 shows an equivalent circuit of a pixel. TFT 50 is used as an active switching element with a gate electrode 51, a drain electrode 52, and a source electrode 53. The source electrode 53 is connected to a display electrode 57 of the liquid crystal display element 54. Both the scan bus line 55 and the data bus line 56 are formed on the first transparent substrate and the two bus lines 55 and 56 are perpendicular to each other. The gate electrode 51 is connected to scan, bus line 55 and the drain electrode 52 is connected to the data bus line 56.

The display electrode 57 of the liquid crystal element is formed on the first transparent substrate and is connected to the source electrode 53 of the TFT 50. The common electrode 58 of the liquid crystal display element is formed on the second transparent glass substrate.

A matrix of opaque patterns is selectively printed on the second transparent substrate. These opaque patterns are used as light shields for the TFTs and increase the contrast ratio of the display. In order to avoid the leakage of any light from the gap between the display electrode 57 and the data bus bus line 56, the opaque pattern must overlap the display electrode 57.

The TFT 50, the display electrode 57 of the liquid crystal element 54, the bus line 55, and the data bus line 56 are all formed on the first substrate. Both the first substrate and the second substrate are sealed together at their peripheral regions with small spacing to embed the liquid crystal medium.

By applying address pulse sequentially to the scan bus line 55 and applying data pulse to every data bus line 56 in synchronism with the address pulse, the information signal is transmitted to all the liquid crystal pixels 54 in the same row. The signal is held for one frame period. In more detail, when the scan line 55 is addressed, a pulse is applied to the gate electrode 51 to turn on the TFT 50. The data signal voltage is impressed on the liquid crystal element 54 through data bus line 56, and the capacitance of the liquid crystal element 54 is charged up. The charge is held after the TFT is turned off. When the scan bus line 55 is addressed next time, i.e. after 16.7 msec, the liquid crystal element 54 is charged up again corresponding to the new signal. The period between successive addressing is called the "frame time".

The liquid crystal display element 54 cannot be supplied with an DC voltage, and the data signal must alternately change its polarity in successive frames. FIG. 2(a) shows the waveforms of the address pulse, FIG. 2(b) shows the waveform of the data pulse, and FIG. 2(c) shows the ideal resultant waveform across the display element 54 which is symmetrical with respect to the time axis (x-axis) with zero DC component.

Amorphous TFTs are widely used as the switching transistors of the actrix matrix liquid crystal display. The gate electrode and the source/drain electrodes of typical amorphous silicon TFTs inevitably have overlap regions. The overlap regions introduce stray gate-source capacitance CGS and stray gate-drain capacitance CGD of the TFT. As shown in FIG. 2, the capacitance CLC is in parallel with a storage capacitance Cs. The stray capacitance CGS affects the resultant waveform of the liquid crystal capacitance. With the address pulse shown in FIG. 2(a) and the data pulse shown in FIG. 2(b), the resultant waveform which appears at the liquid capacitance CLC and the storage capacitance Cs is shown in FIG. 3. A voltage spike appears at the resultant waveform when the gates electrode is dropped from a positive bias to a negative bias. The voltage step can be expressed as $$VGS = \frac{CGS}{CGS + CLC + Cs} VG$$

where VG is the voltage difference between the positive bias and the negative bias at the gate electrode. The voltage spike VGS introduces an unacceptable DC voltage level across the liquid crystal capacitance The voltage spike is described in the article, "Analysis and design of a Si TFT/LCD panel with a pixel model", in the *IEEE Transaction on Electron Devices*, vol.36, no.12, p.2953, 1989, by Y. Kaneko et al. The DC voltage level across the liquid crystal introduces a residual image on the liquid crystal display. The residue image phenomenon of thin film transistor liquid crystal displays is described in the article, "10.4-in.-diagonal color TFT-LCDs without residue images", in the 1990 *SID Digest*, p.408, by Y. Kanemori et al. In order to eliminate the DC component, a negative DC bias −VGS can be applied to the common electrode of the liquid crystal capacitor, as shown in FIG. 4, where the common electrode is the common second substrate of the panel. FIG. 5 shows the resultant waveform across the liquid crystal capacitance. In FIG. 3, region A is smaller than region B, and the DC component applied to the liquid crystal is −VGS. If the negative DC bias −VGS applied to the common electrode is as shown in FIG. 5, the region A is equal to region B, i.e., the DC level is eliminated. However, if the stray capacitance of the pixels in the liquid crystal display are not uniform, the voltage spike at each pixel is different, and the DC voltage levels of the pixels in the display cannot be all adjusted to zero.

For a large area TFTLCD, the total display area is much larger than the area which can be exposed in one shot by a stepper in the photo-lithography process In the TFT fabrication process, the pattern of each mask layer is composed by a number of shots of exposures. The operation of the stepper is described in the article, "Lithography for flat paenl video dispaly", in *Solid State Technology*, p.103, February, 1988, by G. Resor. The patterns of one mask layer are butted by many exposures. FIG. 6 shows an example of a 10 inch TFT array, where A, B, C, . . . represent the different exposure areas. The alignment marks cannot be drawn within the display area, and must be drawn at the edge of the patterned area. If one exposure area of a stepper is 2 by 2 square inches, then the display area must be butted by 3×4 times of exposures. The exposure procedures are accomplished by searching for two alignment marks, next correcting for the error between substrate and the lens, and then exposing the 3×4 exposures step by step. It should be pointed out that the stepper machine cannot correct the butting error at each exposure.

Between each exposure, the substrate stage must be moved by a distance of 2 inches. The stage motion inevitably introduces butting errors due to "backlash". Using the substrate stepper, the exposed area A and the exposed area B in FIG. 6 may have different butting errors, which are introduced from the stage motion error.

FIG. 7 shows the effect of the butting error during production of TFTs. FIG. 7(a) shows the cross-sectional view of a pixel of an amorphous silicon TFT array. The pixel comprises an amorphous silicon TFT 140, a transparent indium-tin oxide (ITO) pixel electrode 141, and the electrode 142 of a storage capacitance. The area of the storage capacitor is the overlap region of the ITO electrode 141 and the electrode 142. The gate dielectric film 143 is also used as the dielectric film of the storage capacitor. The gate electrode 144 and the source electrode 145 have an overlap width of La. The capacitance of the gate-source stray capacitor is proportional to the width of La. FIGS. 7(b) and (c) show the pixels with alignment errors. In FIG. 7(b), the source electrode 145 and the drain electrode 146 are shifted to the right side by Lr. In FIG. 7(c), the source electrode 145 and the drain electrode 146 are shifted toward the left side by L1. It is obvious that the gate-source stray capacitance of the TFT in FIG. 7(b) is smaller than that in FIG. 7(a), and the gate-source stray capacitance of the TFT in FIG. 7(c) is larger than that in FIG. 7(a).

As discussed above, the patterns of the large area display are butted by many shots of exposure, and the butting error of each exposure is different. Different display areas exposed by the different exposures have different stray capacitance. For example, in FIG. 6, the source electrode 145 of the TFTs 140 in exposed area A is shifted to the right side of Lr, as shown in FIG. 7(b); the source electrodes 145 of the TFTs 140 in the exposed area B of FIG. 6 is shifted to the left side of L1, as shown in FIG. 7(c). Then the stray capacitances of the TFTs 140 in the exposed area A is smaller than the predicted value, and the stray capacitances of the TFTs 140 in the exposed area B is larger than the predicted value. Therefore, the induced voltage levels at the exposed area A is smaller than the predicted value, and the induced DC voltage levels at the exposed area B is larger than than the predicted value. Since the induced DC voltage levels at all exposed areas of the panel are not the same, the DC bias of the panel cannot be adjusted to be zero. Different DC voltage levels cause different transmittnce of the liquid crystal. With a small positive DC voltage level, the transmittance of the liquid crystal is enhanced. With a small negative DC voltage level, the transmittance of the liquid crystal is decreased. This "block division" phenomenon is described in detail in the article, "The 8.6 inch-diagonal TFTLCDs of symmetric sub-dot design", in the publication of the 1991 International Display Research Conference (IDRC), p.119, 1991, by K. Nakazawa et al.

To solve the block division problem of the large area thin film transistor liquid crystal display, the symmetric sub-dot design was proposed by K. Nakazawa et al in the same article. Each display element is divided into two sub-dots, such as that indicated by the dotted line 90 in FIG. 8, and each sub-dot has a TFT. These two sub-dots are symmetrical with respect to a sourcebus line. The pattern shift of the source electrode causes the optimum DC voltage to differ from the ideal value. The difference of the left sub-dot is opposite to that of the right side one. Then, the mean transmittance of these two sub-dots is "almost" constant. Thus, if the source electrodes of the TFTs in FIG. 8 is shifted to the left side, then the transmittance of the left side sub-dot is decreased and the transmittance of the right side sub-dot is enhanced.

However, as shown in FIG. 9 (which is the FIG. 3 in Nakazawa's article), the transmittance versus applied DC voltage curves of the liquid crystal are not symmetrical with respect to the zero DC voltage, and the mean transmittance of the two sub-dots are not constant. Besides, the DC voltage level of each sub-dot in a pixel is not biased to zero. Thus, the residual image may still be observable. Moreover, because the pixel is divided into two sub-dots, the area of the opaque matrix is increased and the aperture ratio (i.e. the fraction of the display area is decreased. Then the brightness of the TFTLCD is decreased.

SUMMARY OF THE INVENTION

It is the primary object of the present invention to provide an amorphous silicon thin film transistor addressed liquid crystal display (TFTLCD) in which the DC voltage level of every pixel in a large area display can adjusted to zero. Another object of the present invention is to provide a large TFTLCD design method, wherein the patterning of every layer is formed by many mask exposures in production without any undesirable socalled "block division" effect. Still another object of this present invention is to provide a method to compensate for the difference in feedthrough capacitance of the TFT due to butting or alignment errors in multiple exposures required for large area TFTLCD.

These objects and advantages are achieved in this invention by adding a compensation capacitor to each pixel of a large area TFTLCD The compensation capacitance is complementary to the feedthrough capacitance of the TFT, such that the sum of the compensating capacitance and the feedthrough capacitance is constant.

The dielectric of the compensation capacitor is the same as that of the source region of the TFT. The first electrode of the compensation capacitor is connected to the respondent scan line or the gate electrode of the respondent TFT. The second electrode of the compensation capacitor has the same structure as the source region of the TFT, and has a mirror image of the source region of the TFT.

BRIEF DESCRIPTION OF THE DRAWINGS

FIG. 6 shows the exposure shots of a ten inch TFTLCD. The display area consists of 12 shots of exposure (from A to L). The alignment marks are along the periphery of the display area.

FIG. 7 shows: (a) the cross-sectional view of the conventional TFT on a glass substrate, (b) the cross-sectional view of the TFT with the source and the drain misaligned toward the right side by Lr with respect to the gate, (c) the cross-sectional view of the TFT with the source and the drain misaligned toward the left side by L1 with respect to the gate.

FIG. 13(a) shows the cross-sectional view taken along line B—B' or line C—C' in FIG. 10, and (b) shows the cross-sectional view taken along lines B—B' or C—C' in FIG. 10, if the source/drain electrodes of the TFT and the electrode of the compensation capacitor are shifted toward the right side, and (c) shows the cross-sectional view taken along line B—B' or C—C' in FIG. 10, if the source/drain electrodes of the TFT and the electrode of the compensation capacitor are shifted toward the left side.

FIG. 16 shows the cross-sectional view taken along different sectional lines A—A', B—B' and C—C' in FIGS. 14(a) and 14(b).

DESCRIPTION OF THE PREFERRED EMBODIMENT

Figure 10:
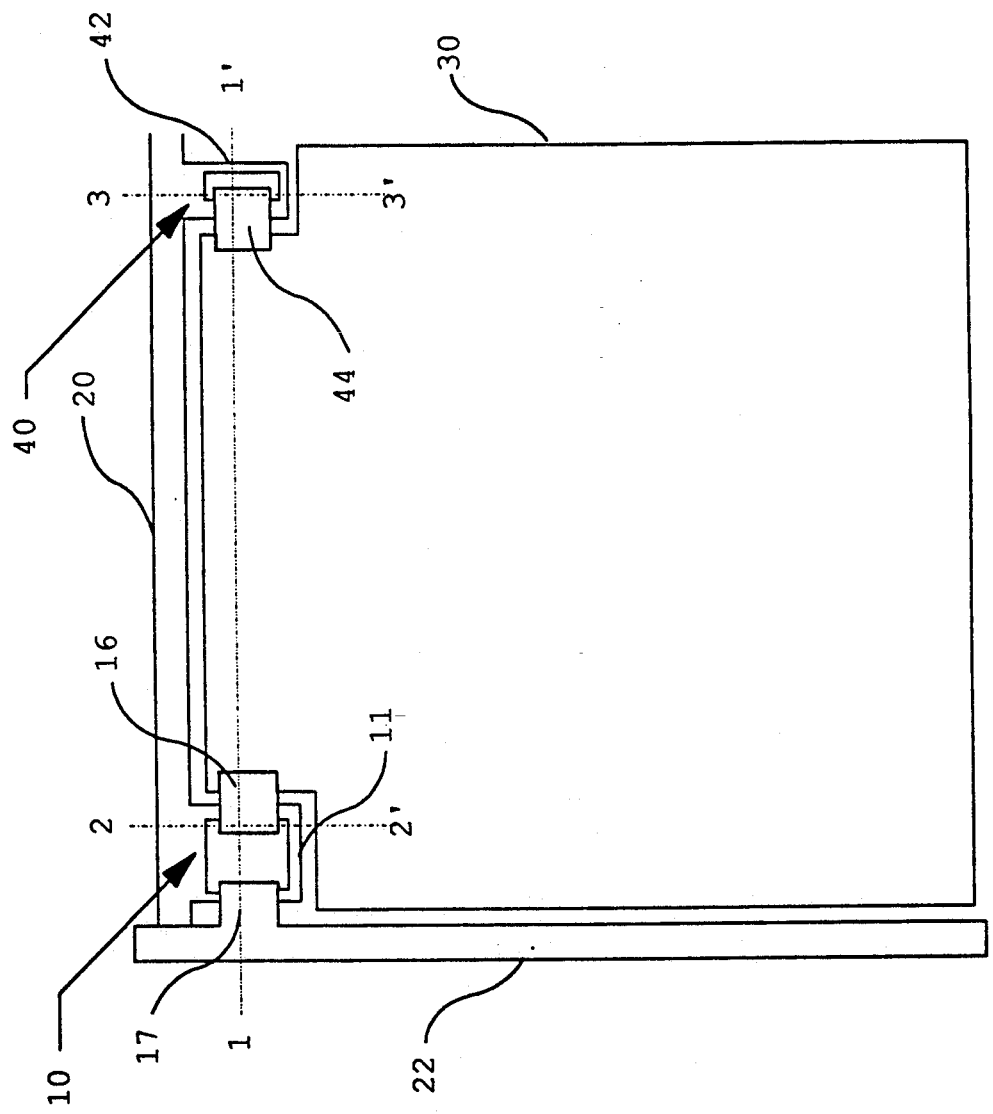
FIG. 10 shows the plane view of one pixel portion of an active matrix type display apparatus according to the embodiment of the present invention with an additional compensation capacitor.
Figure 11:
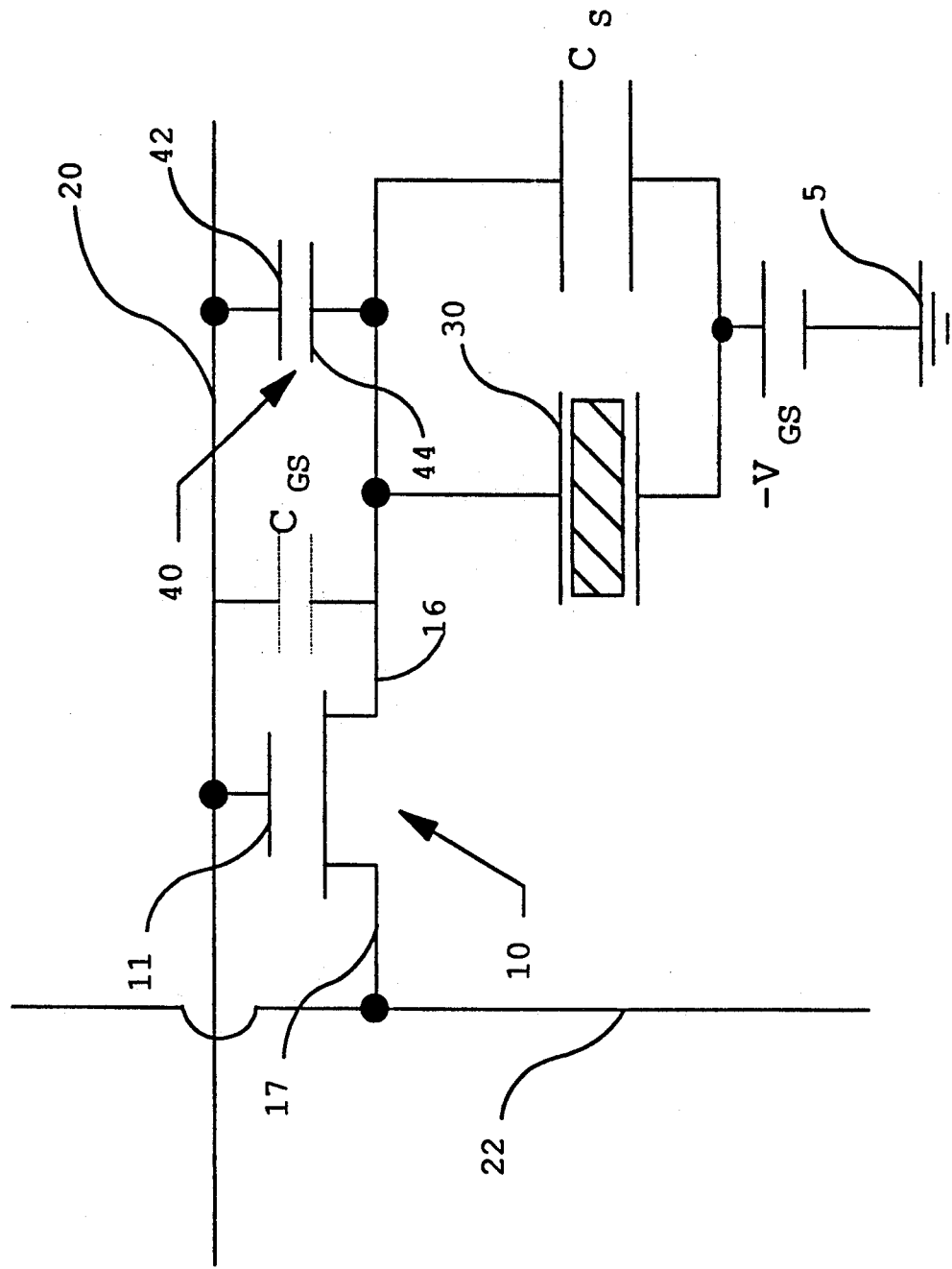
FIG. 11 shows an equivalent circuit of the present invention with a compensation capacitor.

FIG. 10 shows the plane view of an example of a pixel arrangement on the first transparent glass substrate (not shown in this figure) of the present invention. A switch element 10 such as an amorphous silicon TFT, scan bus line 20, data bus line 22, display electrode 30, and compensation capacitor 40 are formed on a first transparent glass substrate 2, as shown in FIG. 12. The equivalent circuit of this invention is shown in FIG. 11. The display electrode 30 is connected to the source electrode 16 of the switch element 10, and the display electrode 30 is also connected to the second electrode 44 of the compensation capacitor 40. The drain electrode 17 of the switch element 10 is connected to the data bus line 22. The gate electrode 11 of the switch element 10 and the first electrode 42 of the compensation capacitor 40 are connected to the scan bus line 20, and the common electrode 5 of the active matrix liquid crystal display is on the second transparent substrate. The source-gate stray capacitance CGS of the TFT due to the overlap of the source electrode 16 and the gate electrode 11 is also shown in FIG. 11. The compensation capacitor is connected in parallel with the stray capacitance CGS.

Figure 12A:
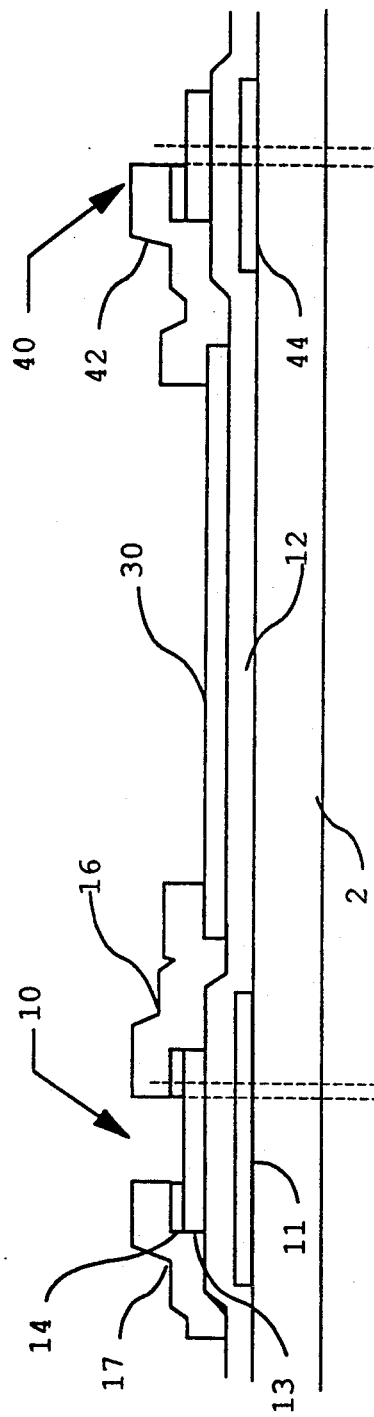
FIG. 12 (a) shows the cross-sectional view taken along line A—A' in FIG. 10, and (b) shows the cross-sectional view taken along line A—A' in FIG. 10, if the source/drain electrodes of the TFT and the electrode of the compensation capacitor are shifted toward the right side, and (c) shows the cross-sectional view taken along line A—A' in FIG. 10, if the source/drain electrodes of the TFT and the electrode of the compensation capacitor are shifted toward the left side.

A cross-sectional view taken along the dot-dash line A—A' in FIG. 10 is shown in FIG. 12(a). In this figure, the gate electrode 11 of the amorphous silicon TFT 10, the first electrode 11 of the compensation capacitor 40, and the scan bus line 20 are formed on the first transparent glass substrate 2 by depositing a metal film and using photo-lithography techniques for masking and etching. Then, consecutively, a gate insulating layer 12, an amorphous silicon layer 13, and a doped amorphous silicon layer 14 are disposed of. The amorphous silicon layer 13 and the doped amorphous silicon layer 14 are removed except the areas for the amorphous silicon TFT 10 region and the semiconductor layer region of the compensation capacitor 40. The display electrode 30 is formed on the first substrate. After contact holes ("windows") are opened, the source electrode 16, the drain electrode 17, the data bus line 22, and the second electrode 44 of the compensation capacitor 40 are formed by depositing a metal film on the substrate and selectively etched using photo-lithographic process. Finally, the doped amorphous silicon layer 14 is etched except the regions below the electrodes 16, 17, and 44. The first electrode 42 of the compensation capacitor 40 are formed together with the gate electrode 11 of the amorphous silicon TFT 10, and the second electrode 44 of the compensation capacitor 40 are formed together with the source/drain electrodes 16/17 of the amorphous silicon TFT 10.

Figure 1:
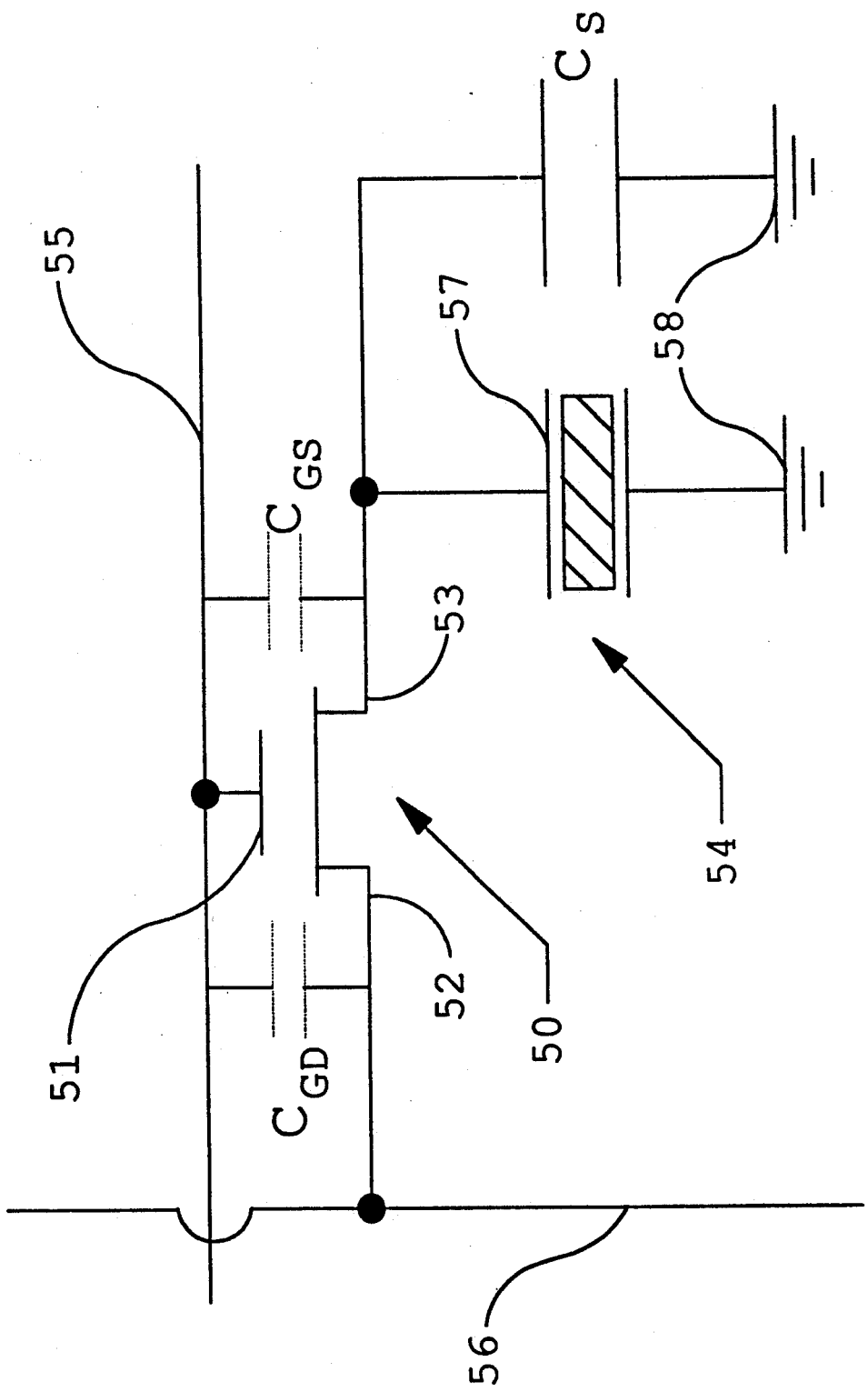
FIG. 1 shows the equivalent circuit of a picture element (pixel) of a conventional thin film transistor/liquid crystal display. The stray capacitances CGS and CGD of the pixel are also shown in this figure.
Figure 2A:
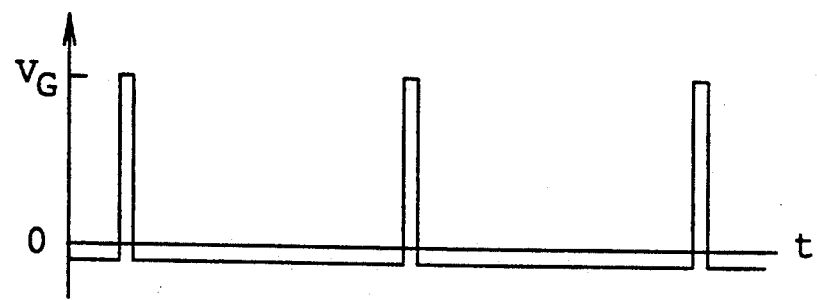
FIG. 2(a) shows the waveform of an address pulse.
Figure 2B:
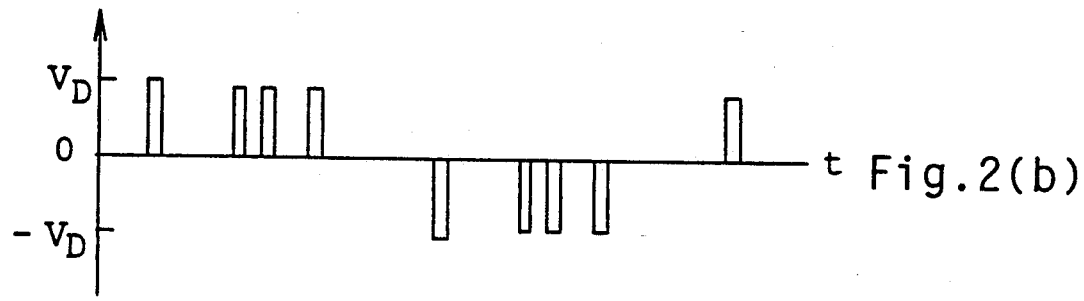
FIG. 2(b) shows the waveform of the data pulse.
Figure 2C:
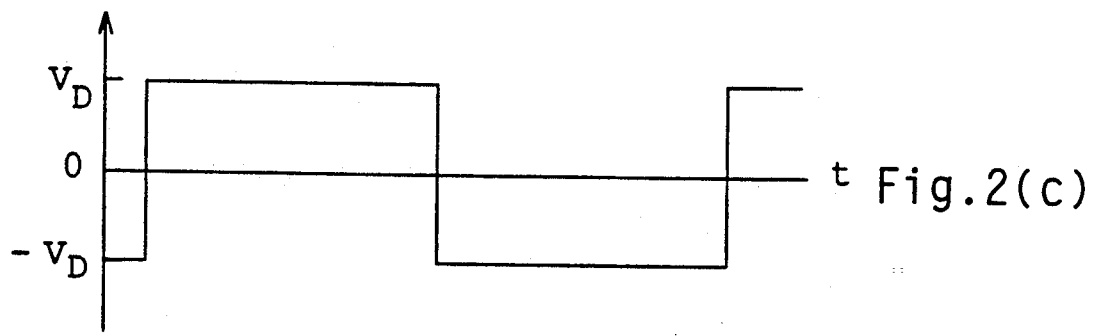
FIG. 2(c) shows the ideal resultant waveform across the display element.
Figure 3:
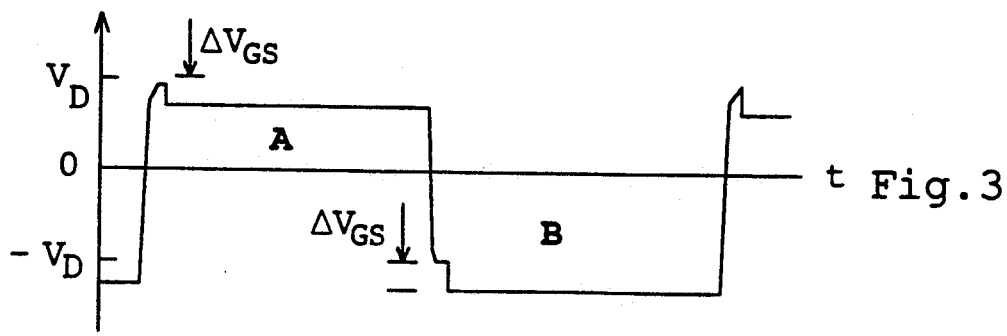
FIG. 3 shows the resultant waveform of a pixel. The voltage spikes VGS are observed in the waveform. They occur at the waveform when the gate electrode of the TFT is dropped from positive bias to negative bias.
Figure 4:
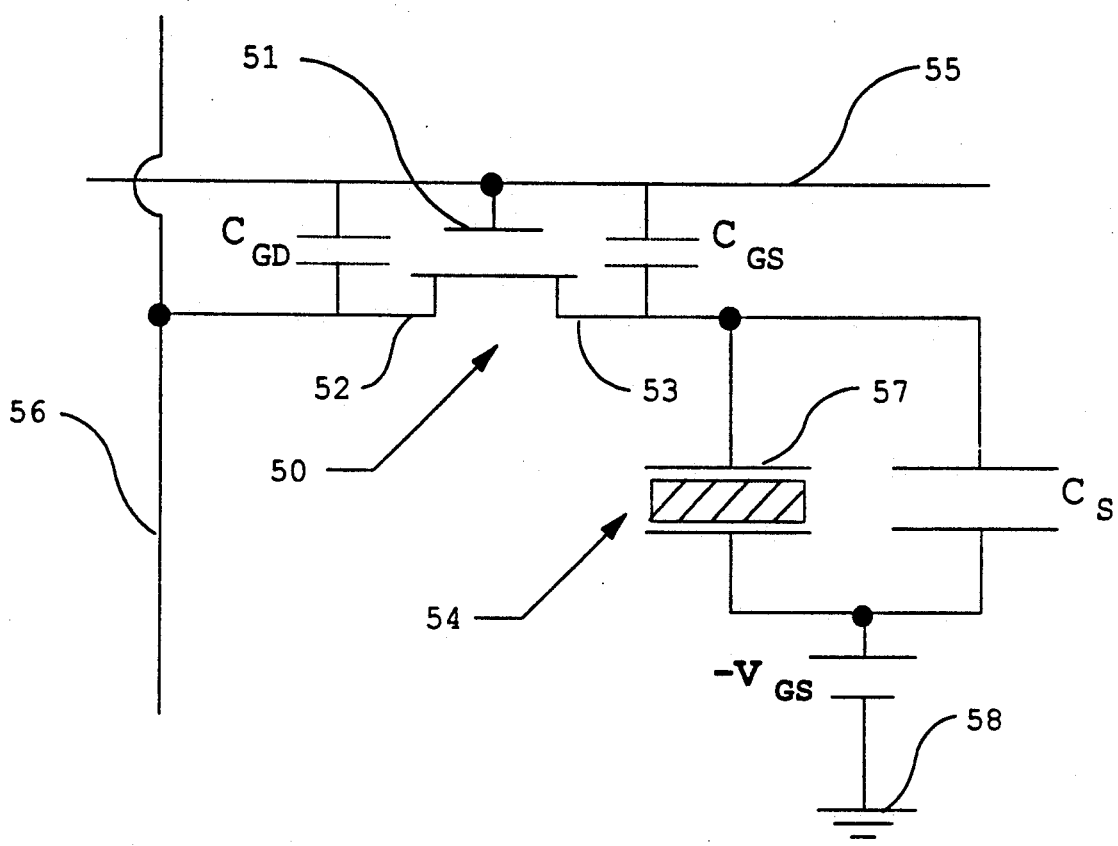
FIG. 4 shows a method to eliminate to DC voltage shift due to the voltage spikes shown in FIG. 3. A negative voltage $-VGS$ is applied to the common electrode of the TFTLCD.
Figure 5:
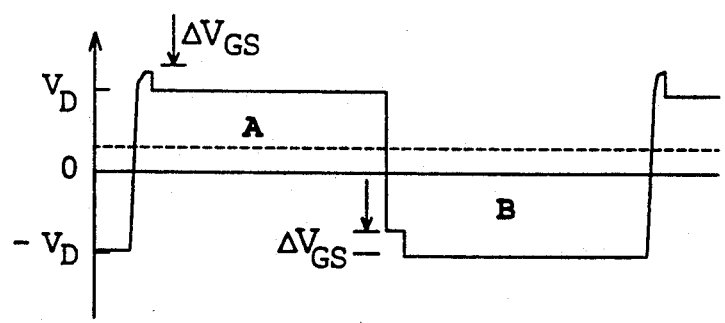
FIG. 5 shows the resultant waveform across the liquid crystal capacitor of FIG. 4. In this figure, region A is equal to the region B. Thus the DC voltage level is zero.
Figure 8:
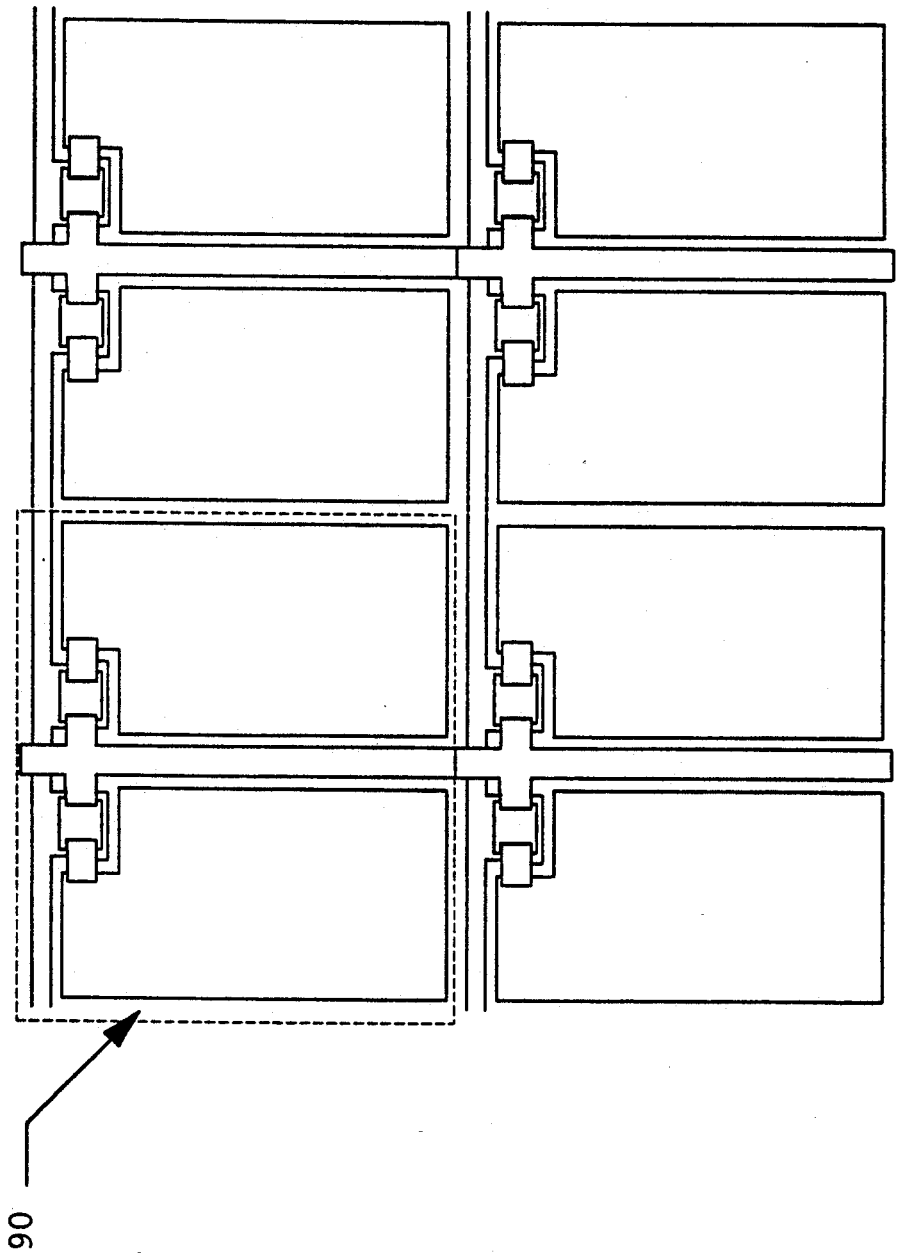
FIG. 8 shows the plane view of a symmetric sub-dot design.
Figure 9:
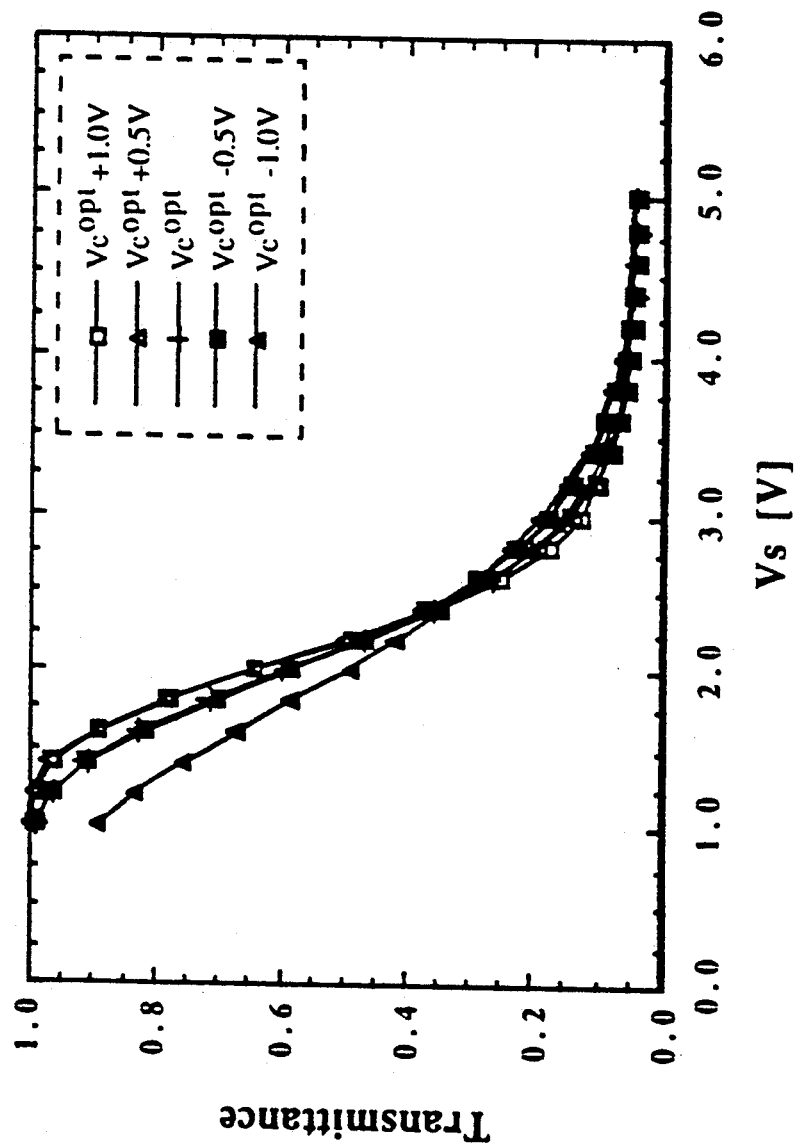
FIG. 9 shows the transmittance curve versus applied DC voltage of liquid crystals.
Figure 12B:
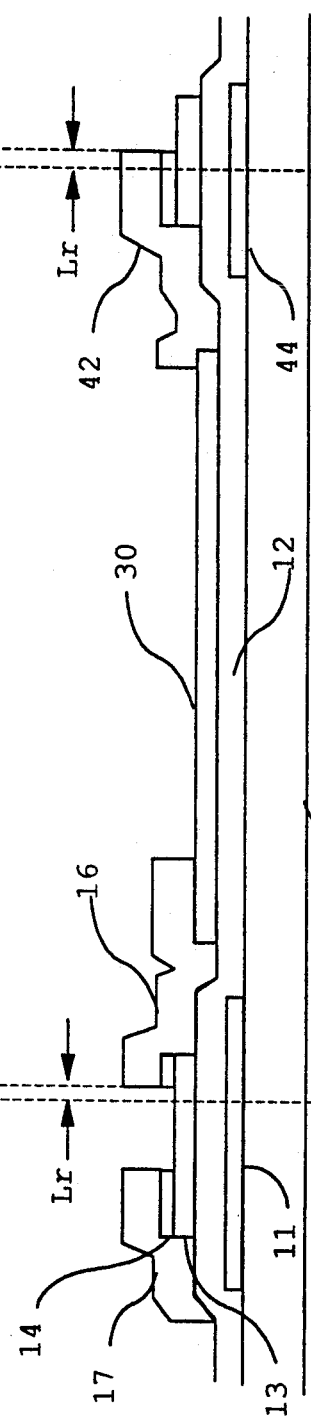
Figure 12C:
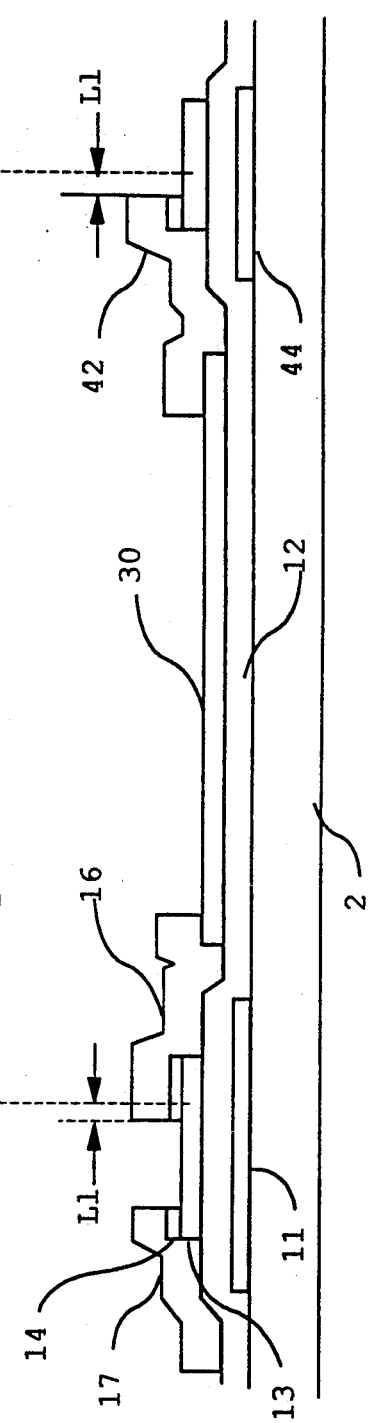
Figure 14:
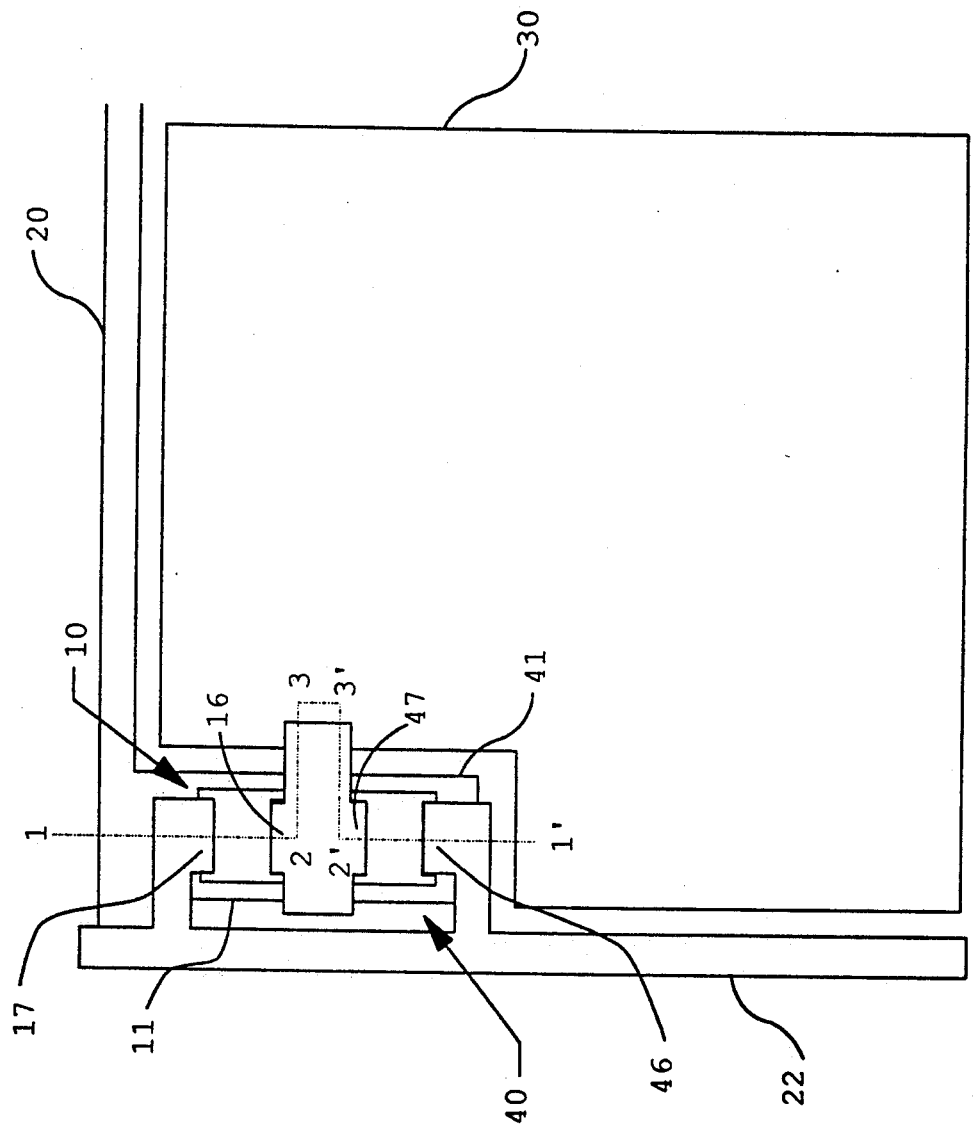
FIG. 14(a) shows the plane view of one of the pixel portion of an active matrix type apparatus according to another embodiment of the present invention with another TFT used as an additional compensation capacitor.
FIG. 14(b) shows the plane view of one of the pixel portion of an active matrix type apparatus according to still another embodiment of the present invention with another TFT used as an additional compensation capacitor.
Figure 15:
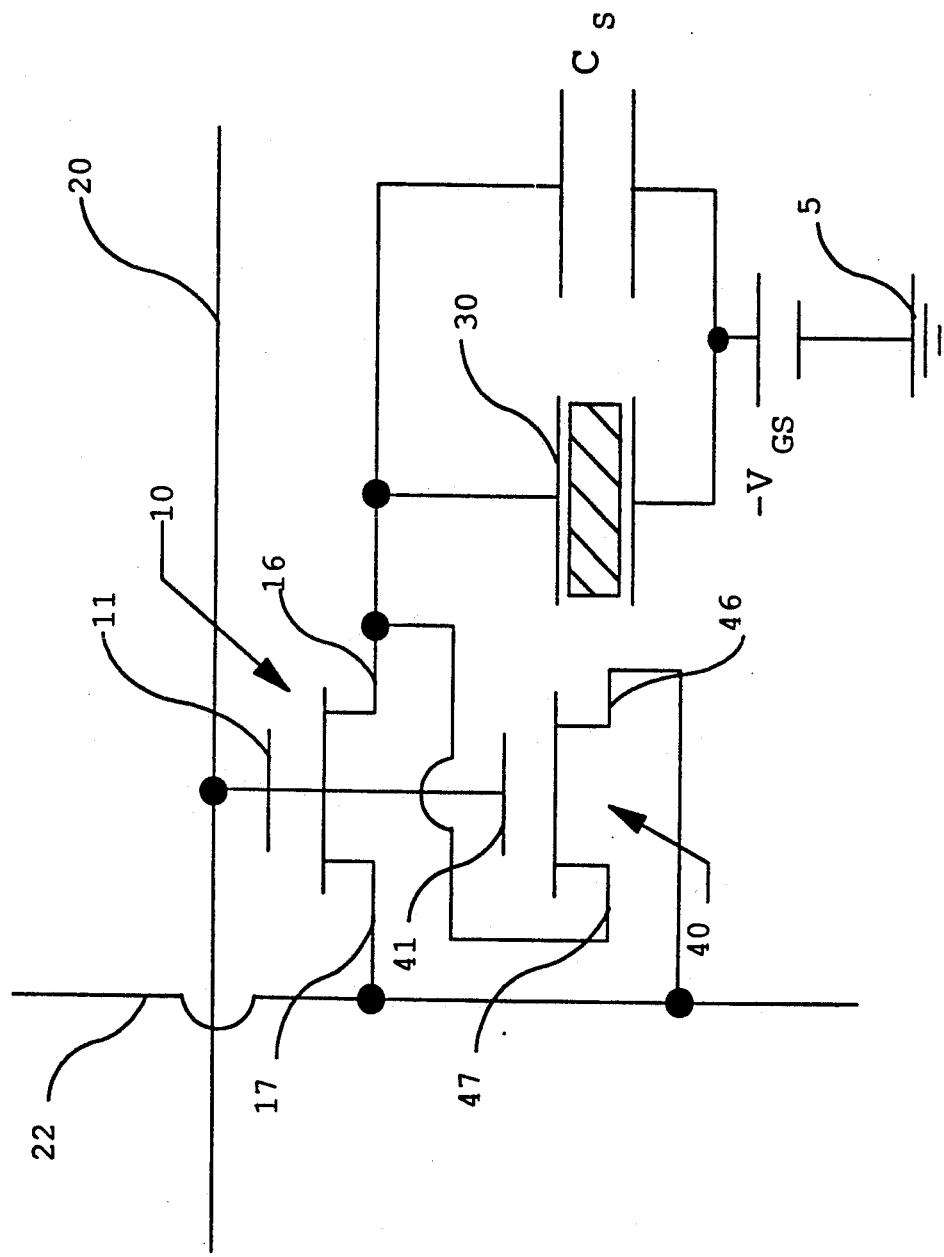
FIG. 15 shows the circuit diagram of FIGS. 14(a) and 14(b).

FIGS. 12(b),(c) show the cross-sectional views along the line A—A' of FIG. 10 or FIGS. 14(a) and FIG. 14(b), where the electrode capacitance of another TFT shown in FIG. 15 with gate 41, source 47 and drain 46 serves as the compensation capacitor 40 if there is misalignment between the source/drain electrodes 16/17 and the gate electrode 11. In FIG. (b), FIG. 12(b) corresponding to FIG. 10 or FIG. 16 corresponding to FIGS. 14(a) and 14(b), the source/drain electrodes 16/17 are shifted toward the right side by Lr. The stray capacitance CGS between the gate and the source of the TFT is reduced because the overlap region of the the source electrode and the gate electrode is reduced by an area Lr×W, where W is the width of the TFT, while the overlap region of the compensation capacitor is increased by Lr×W. Thus, the resultant capacitance between the gate and the source of the pixel in FIG. 12(b) is equal to that in FIG. 12(a). In FIG. 12(c), the source/drain electrodes 16/17 are shifted toward the left side by L1. The stray capacitance CGS between the gate 11 and the source 16 of the TFT is increased by L1×W, but the compensation capacitor 40 is decreased by an area L1×W. Thus, the resultant capacitance between the scan bus line 20 and the display electrode 30 of the pixel in FIG. 12(c) is equal to that in FIG. 12(a). FIG. 3(a) shows the cross-sectional view along the line B—B' (and line C—C') of FIG. 10, with the width of the source electrode smaller than the width of the gate of the width of the gate electrode. FIGS. 12(b) and (c) show the cross-sectional views along the line B—B' (or line C—C') if the misalignment occurs. The source electrodes are still within the shadow of the gate electrode. Thus the stray capacitance of the TFT in FIGS. 13(b) and (c) are equal to that in FIG. 13(a). From the results discussed above, the equivalent capacitance between the gate electrode and the source electrode can be kept constant, even when the Y-direction misalignment between the source electrode of the TFT and the gate electrode occurs as shown in FIG. 10.

The compensation capacitor can be placed below the shadow of the black matrix. It does not occupy any area of the aperture of the display element, i.e., the aperture ratio of the display using the compensation capacitor is not reduced.

The additional compensation capacitor for the thin film transistor array is useful for other applications such as the thin film transistor contact image sensor (TFTCIS), thin film transistors for printer array, especially when the thin film transistors are not fabricated by the self-alignment process.

What is claimed is:

1. An active matrix display system comprising:
   a transparent insulating substrate;
   a plurality of parallel scan bus lines formed on said insulating substrate;
   a plurality of data bus lines formed on said insulating substrate crossing orthogonally but insulated from said scan bus lines;
   a plurality of picture elements (pixels) formed on said insulating substrate, each pixel including:
   a switching device,
   a picture electrode,
   and a compensation capacitor,
   said switching device having an input electrode connected to one of said data bus lines, an output electrode connected to said picture electrode, a control electrode connected to one of said scan bus lines for turning on said switching device, and a stray capacitance between said output electrode and said control electrode,
   said compensation capacitor connected in parallel with said stray capacitance and having a capacitance complementary to said stray capacitance so that the sum of said stray capacitance and the capacitance of the compensation capacitor is constant regardless of the misalignment error of the mask for patterning said control electrode with respect to the mask for patterning said output electrode during photo-lithography.

2. An active matrix display according to claim 1, wherein said switching element is a thin film field effect transistor (TFT).

3. An active matrix display system according to claim 2, wherein said TFT is an amorphous silicon thin film transistor.

4. An active matrix display system according to claim 3, wherein a first electrode of said compensation capacitor is connected to said one of said scan bus lines, and a second electrode of said compensation capacitor is connected to said picture electrode.

5. An active matrix display system according to claim 4, wherein said second electrode of the compensation capacitor is fabricated with the same masking layer as the source electrode of the TFT.

6. An active matrix display system according to claim 2, wherein said TFT is a polycrystalline silicon thin film transistor.

7. An active matrix display system according to claim 2, wherein said output electrode is the source of said TFT, said input electrode is the drain of said TFT, and said control electrode is the gate of said TFT.

8. An active matrix display system according to claim 7, wherein the dielectric layer of the compensating capacitor is the same as the layer in the overlap region of said source electrode and said gate electrode of the TFT.

9. An active matrix display system as described in claim 7, wherein the interelectrode capacitance of a second TFT is used as said compensation capacitor.

10. A large area thin film transistor array comprising thin film transistors, each having a compensation capacitor connected in parallel with inter-electrode capacitance between the gate of the thin film transistor and the source of the thin film transistor to equalize the total capacitance of the compensation capacitor and the inter-electrode capacitance regardless of misalignment of the mask for patterning the gate electrode with respect to the mask for patterning the source electrode during photo-lithography.

* * * * *